(12) United States Patent
Davis et al.

(10) Patent No.: US 9,988,919 B2
(45) Date of Patent: Jun. 5, 2018

(54) DUAL COMPLIANT SEAL

(71) Applicant: UNITED TECHNOLOGIES CORPORATION, Farmington, CT (US)

(72) Inventors: Timothy M Davis, Kennebunk, ME (US); Mark J. Rogers, Kennebunk, ME (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 400 days.

(21) Appl. No.: 14/830,806

(22) Filed: Aug. 20, 2015

(65) Prior Publication Data

US 2016/0115813 A1 Apr. 28, 2016

Related U.S. Application Data

(60) Provisional application No. 62/068,470, filed on Oct. 24, 2014.

(51) Int. Cl.
*F01D 11/00* (2006.01)
*F16J 15/08* (2006.01)
*F16J 15/10* (2006.01)
*F16J 15/02* (2006.01)
*F16J 15/06* (2006.01)

(52) U.S. Cl.
CPC ........... *F01D 11/005* (2013.01); *F16J 15/065* (2013.01); *F16J 15/0812* (2013.01); *F16J 15/0887* (2013.01); *F16J 15/104* (2013.01); *F05D 2220/32* (2013.01); *F05D 2240/55* (2013.01); *Y02T 50/672* (2013.01)

(58) Field of Classification Search
CPC ........ F01D 11/003; F01D 11/005; F02C 7/28; F16J 15/022; F16J 15/028; F16J 15/0812; F16J 15/0887; F16J 15/104; F05D 2240/55
See application file for complete search history.

(56) References Cited

U.S. PATENT DOCUMENTS

| | | | | |
|---|---|---|---|---|
| 7,360,769 B2* | 4/2008 | Bennett | ................. | F01D 11/005 277/641 |
| 8,142,142 B2* | 3/2012 | Zborovsky | .............. | F01D 9/023 415/185 |
| 8,695,989 B2* | 4/2014 | Dahlke | .................... | F23M 5/02 277/644 |
| 2004/0052637 A1* | 3/2004 | Paprotna | ............... | F01D 11/005 415/170.1 |
| 2005/0242525 A1* | 11/2005 | Dahlke | .................... | F23M 5/02 277/605 |
| 2007/0158919 A1* | 7/2007 | Bennett | ................. | F01D 11/005 277/644 |
| 2010/0061837 A1* | 3/2010 | Zborovsky | .............. | F01D 9/023 415/58.4 |

(Continued)

*Primary Examiner* — Nicholas L Foster
(74) *Attorney, Agent, or Firm* — Cantor Colburn LLP

(57) ABSTRACT

The present disclosure relates generally to a seal between two circumferential components. The seal comprises a first rope seal partially disposed within a first retainer, a second rope seal partially disposed within a second retainer, a carrier including a first end operatively coupled to the first retainer and a second end operatively coupled to the second retainer.

7 Claims, 6 Drawing Sheets

(56) References Cited

U.S. PATENT DOCUMENTS

2014/0367925 A1* 12/2014 Dahlke .................... F23M 5/02
                                                    277/641
2016/0115814 A1*  4/2016 Davis ....................... F16J 15/08
                                                    277/591
2016/0281516 A1*  9/2016 Heaven ................... F01D 9/041

* cited by examiner

DUAL COMPLIANT SEAL

CROSS REFERENCE TO RELATED APPLICATION

This application claims the benefit of and incorporates by reference herein the disclosure of U.S. Ser. No. 62/068,470, filed Oct. 24, 2014.

TECHNICAL FIELD OF THE DISCLOSURE

The present disclosure is generally related to seals and, more specifically, to a compliant rope seal.

BACKGROUND OF THE DISCLOSURE

Seals are used in many applications to prevent or limit the flow of a gas or liquid from one side of the seal to another side of the seal. For example, seals are used in many areas within a gas turbine engine to seal the gas path of the engine. The performance of gas path seals affects engine component efficiency. For example, the loss of secondary flow into the gas path of a turbine engine has a negative effect on engine fuel burn, performance/efficiency, and component life. A metal w-seal or a non-metallic rope seal are typical seals used to seal or limit secondary flow between segmented or full-hoop turbine components. However, exposure to significant relative deflections between adjacent components and/or elevated temperatures can preclude the use of these types of seals or decrease their longevity. If subjected to significant deflections, a w-seal will deform and become ineffective. Using a higher strength material improves deflection capability somewhat, but generally at the expense of limiting temperature capability. Wear resistance can be a problem as well in an environment of significant relative motion. A rope seal typically has high temperature capability but less relative flexibility.

Improvements in seal design are therefore needed in the art.

SUMMARY OF THE DISCLOSURE

In one embodiment, a seal for sealing a space defined by first and second adjacent components disposed about a centerline is disclosed, the seal comprising: a first compliant seal; a second compliant seal; a first retainer partially enclosing the first compliant seal; a second retainer partially enclosing the second rope seal; and a carrier having a first end operatively coupled to the first retainer and a second end operatively coupled to the second retainer; wherein the first and second compliant seals are configured to sealingly engage with the first and second components.

In a further embodiment of the above, the first compliant seal comprises a first rope seal and second compliant seal comprises a second rope seal.

In a further embodiment of any of the above, a portion of the first compliant seal extends from the first retainer and a portion of the second compliant seal extends from the second retainer.

In a further embodiment of any of the above, a wave spring is disposed between the carrier and at least one of the first and second components and operative to bias the first compliant seal against the first component and the second compliant seal against the second component.

In a further embodiment of any of the above, the first and second rope seals comprise braided ceramic rope seals.

In a further embodiment of any of the above, the first and second retainers are semi-circumferential in cross-section.

In a further embodiment of any of the above, the seal is selected from the group consisting of: continuous hoop and split.

In a further embodiment of any of the above, the first retainer, the second retainer, and the carrier are formed from a material selected from one of a high-temperature metal alloy, a high-temperature ceramic material, and a high-temperature ceramic composite, or a combination of two or more of a high-temperature metal alloy, a high-temperature ceramic fiber material and a high-temperature ceramic fiber composite.

In another embodiment, a seal for sealing a space defined by first and second adjacent components disposed about a centerline is disclosed, the seal comprising: a first compliant seal; a second compliant seal; a plurality of seal sections, each of the seal sections comprising: a first retainer partially enclosing the first compliant seal; a second retainer partially enclosing the second compliant seal; and a carrier having a first end operatively coupled to the first retainer and a second end operatively coupled to the second retainer; wherein the first and second compliant seals are configured to sealingly engage with the first and second components.

In a further embodiment of the above, the first compliant seal comprises a first rope seal and second compliant seal comprises a second rope seal.

In a further embodiment of any of the above, a portion of the first compliant seal extends from the first retainer and a portion of the second compliant seal extends from the second retainer.

In a further embodiment of any of the above, a wave spring is disposed between each of the carriers and at least one of the first and second components and operative to bias the first compliant seal against the first component and the second compliant seal against the second component.

In a further embodiment of any of the above, the first and second rope seals comprise braided ceramic rope seals.

In a further embodiment of any of the above, the first retainer, the second retainer, and the carrier are formed from a material selected from one of a high-temperature metal alloy, a high-temperature ceramic material, and a high-temperature ceramic composite, or a combination of two or more of a high-temperature metal alloy, a high-temperature ceramic fiber material and a high-temperature ceramic fiber composite.

In a further embodiment of any of the above, each carrier defines a respective cavity therein having an opening, wherein a first axial dimension of each cavity at its opening is smaller than a second axial dimension of each cavity radially inward from the opening.

In a further embodiment of any of the above, a retaining ring extends through each of the plurality of cavities.

In a further embodiment of any of the above, a third axial dimension of the retaining ring within each of the plurality of cavities is greater than the first axial dimension.

In a further embodiment of any of the above, the retaining ring comprises a split ring defining a first retaining ring end and a second retaining ring end, and one of the plurality of seal segments is formed as a keeper seal segment and further comprises an axial strap disposed in the cavity of the keeper seal segment, wherein the first retaining ring end is disposed on a first side of the axial strap and the second retaining ring end is disposed on a second side of the axial strap.

In another embodiment, a system is disclosed, comprising: a first arcuate component disposed about a centerline and including a first surface; a second arcuate component disposed about the centerline and including a second surface, the second arcuate component disposed adjacent the first arcuate component and defining a seal cavity therebetween; and a seal for sealing the seal cavity, the seal including: a first compliant seal; a second compliant seal; a first retainer partially enclosing the first compliant seal; a second retainer partially enclosing the second compliant seal; and a carrier having a first end operatively coupled to the first retainer and a second end operatively coupled to the second retainer.

In a further embodiment of the above, the seal includes: a plurality of seal sections, each of the plurality of seal sections comprising: the first retainer partially enclosing the first compliant seal; the second retainer partially enclosing the second compliant seal; and the carrier having a first end operatively coupled to the first retainer and a second end operatively coupled to the second retainer; and a retaining ring at least partially disposed within the respective cavities of each of the plurality of seal sections.

Other embodiments are also disclosed.

BRIEF DESCRIPTION OF THE DRAWINGS

The embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

DETAILED DESCRIPTION OF THE DISCLOSED EMBODIMENTS

For the purposes of promoting an understanding of the principles of the disclosure, reference will now be made to certain embodiments and specific language will be used to describe the same. It will nevertheless be understood that no limitation of the scope of the disclosure is thereby intended, and alterations and modifications in the illustrated device, and further applications of the principles of the disclosure as illustrated therein are herein contemplated as would normally occur to one skilled in the art to which the disclosure relates.

Figure 1:
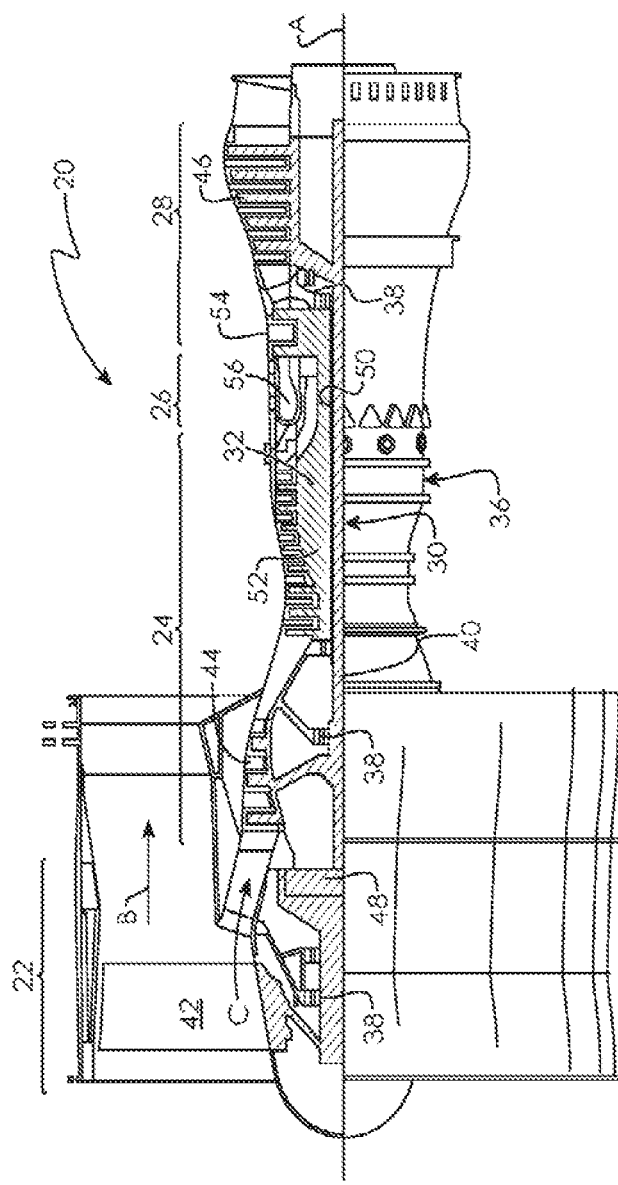
FIG. 1 is a schematic partial cross-sectional view of a gas turbine engine in an embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]$^{0.5}$. The "Low corrected fan tip speed" as disclosed herein according to one non-limiting embodiment is less than about 1150 ft/second (350.5 m/sec).

Figure 2:
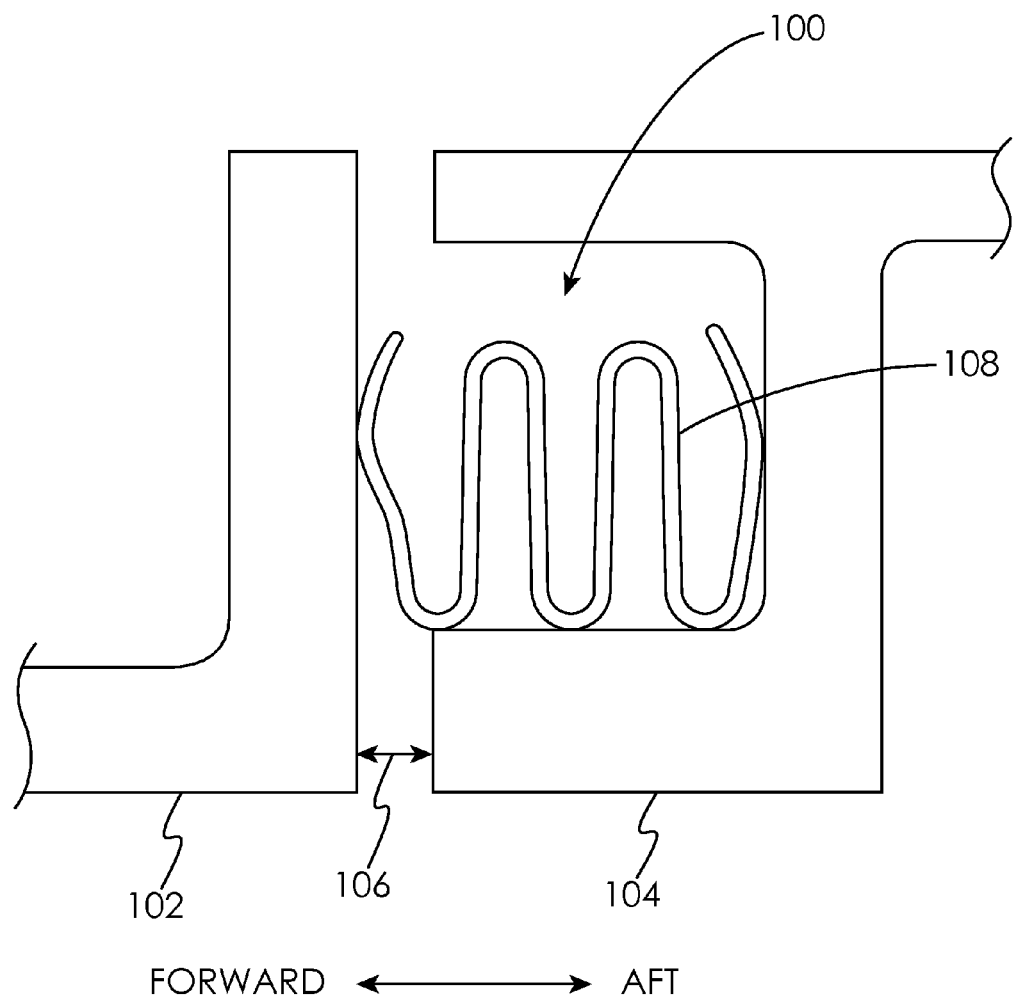
FIG. 2 is a schematic cross-sectional view of a seal and seal cavity in an embodiment.

FIG. 2 schematically illustrates a cross-sectional view of a seal cavity 100 formed by two axially-adjacent segmented or full-hoop circumferential turbine components 102 and 104 which may move axially, radially, and/or circumferentially relative to one another about an axial centerline CL of the turbine engine. It will be appreciated that although turbine components are used to demonstrate the positioning and functioning of the seals disclosed herein, this is done by way of illustration only and the seals disclosed herein may be used in other applications. A nominal design clearance 106 exists between the components 102 and 104. Within the seal cavity 100 lies an annular w-seal 108 formed from a material appropriate to the anticipated operating conditions (e.g., deflection, temperature, pressure, etc.) of the w-seal 108, such as nickel-based alloy to name just one non-limiting example.

The design and material used in the construction of the w-seal 108 causes it to be deflected both forward and aft within the cavity 100, thereby causing it to seat against the components 102 and 104, even when the components 102 and 104 move relative to each other causing the clearance 106 to change. However, if subjected to significant deflections and/or temperature, a w-seal 108 may deform, causing it to become ineffective and potentially liberate.

Figure 3:
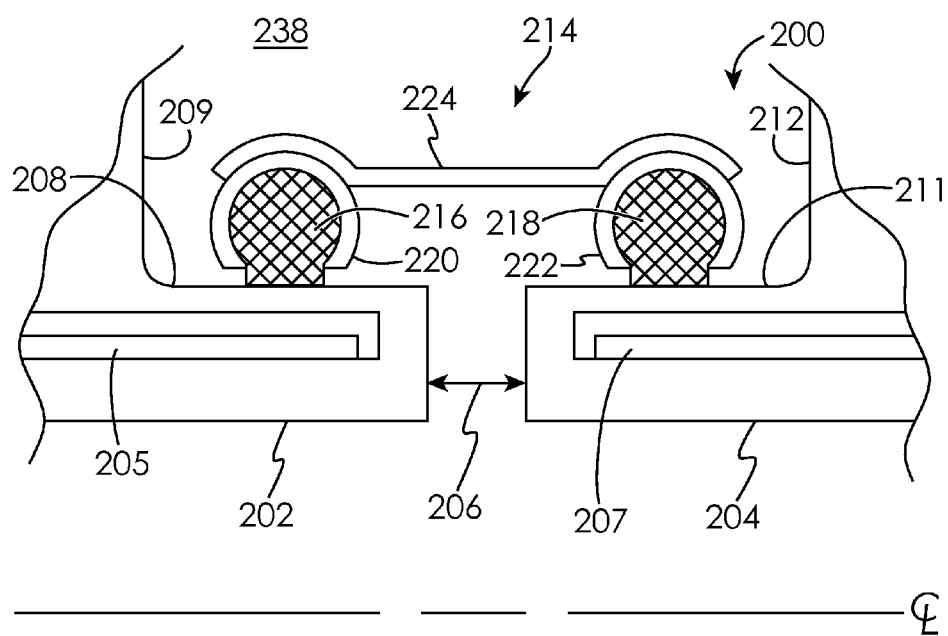
FIG. 3 is a schematic cross-sectional view of a seal and seal cavity in an embodiment.

FIG. 3 schematically illustrates a cross-sectional view of one embodiment of a seal cavity 200 formed by two axially-adjacent segmented circumferential turbine components 202 and 204 which may move axially, radially, and circumferentially relative to one another about an axial centerline of the turbine engine. A nominal design clearance 206 exists between the components 202 and 204. A feather seal 205 may extend through adjacent components 202 while a feather seal 207 may extend through adjacent components 204. Component 202 includes a radially inner surface 208 and an axially forward surface 209, each facing the seal cavity 200. Similarly, component 204 includes a radially inner surface 211 and axially aft surface 212, each facing the seal cavity 200. Within the seal cavity 200 lies a seal 214 formed from materials appropriate to the anticipated operating conditions of the seal 214. The seal 214 includes a first compliant seal (e.g., a rope seal) 216 and a second compliant seal (e.g., a rope seal) 218. The first rope seal 216 and the second rope seal 218 may comprise braided ceramic rope seals in an embodiment. The first rope seal 216 is held by a retainer 220 and the second rope seal 218 is held by a retainer 222. Each of the retainers 220, 222 is semi-circumferential in cross-section (i.e., at least partially encapsulating, circumscribing, or surrounding a portion of a circle) in an embodiment. Each of the retainers 220, 222 mechanically traps the rope seals 216, 218 while exposing enough of the rope seals 216, 218 to allow them to conform to the respective surfaces 208, 211 of the components 202, 204. The retainers 220, 222 may come into contact with surfaces 208, 211 to provide additional sealing in some embodiments. The retainers 220, 222 are each coupled to a carrier 224, such as by laser welding or resistance welding to name just two non-limiting examples. As discussed further below, the seal 214 may comprise a continuous hoop or may be split at one circumferential location. In a split seal 214 embodiment, the seal 214 may be sized in the free state to be smaller than the operating diameter of the components 202, 204 and therefore preload radially inboard within the seal cavity 200 such that the seal 214 is instantly pressurized/pressure-energized in an inboard direction (such as, for example, at engine start-up in turbine engine applications). The retainers 220, 222 and the carrier 224 may be formed from a high-temperature metal alloy, a high temperature ceramic material, a high temperature ceramic composite, or a combination of two or more of these, to name just a few non-limiting examples.

Figure 4:
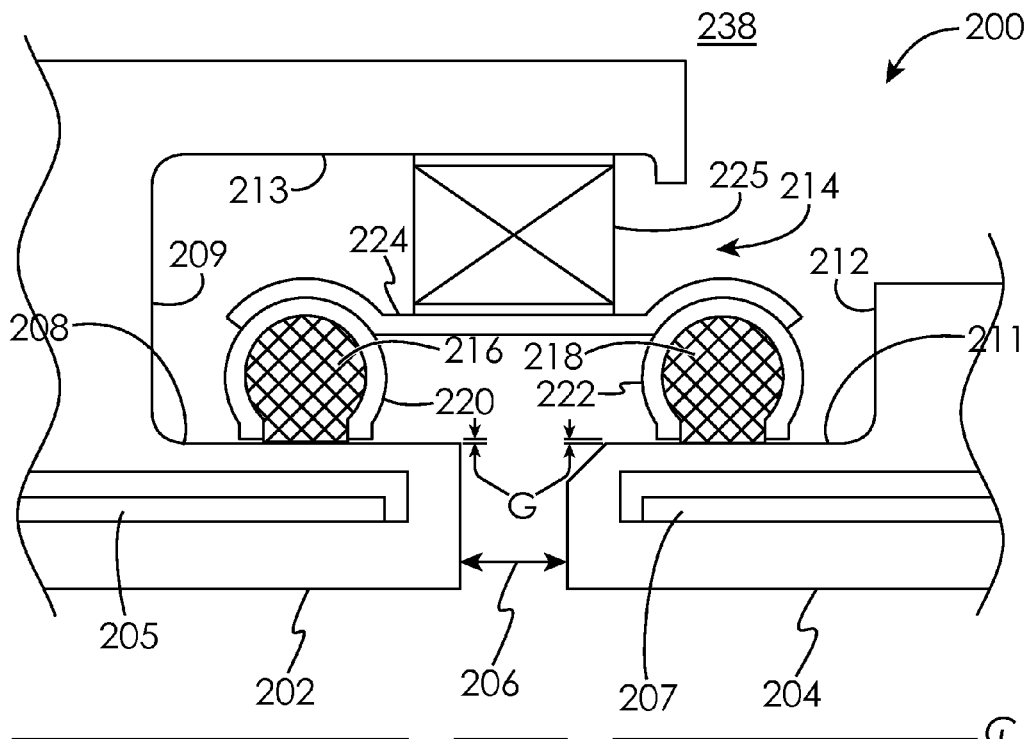
FIG. 4 is a schematic cross-sectional view of a seal and seal cavity in an embodiment.

In the embodiment of FIG. 4, a full hoop wave spring 225 is disposed between the carrier 224 and a surface 213 of the component 202. The wave spring 225 enables the seal 214 to more significantly load radially against the sealing surfaces 208, 211. Pressure differential across the seal 214 during engine operation will load the seal 214 radially inboard, and additional radial load may be applied by the wave spring 225. The spring rate of the wave spring 225 may be chosen to achieve a desired radial load for the seal 214 and assures that the seal 214 is pressure-energized at engine start. A wave spring 225 with a relatively high (stiff) spring rate can be used to minimize the gap G between the retainers 220, 222 and respective surfaces 208, 211 to provide a secondary seal in addition to that provided by the rope seals 216, 218.

Figure 5:
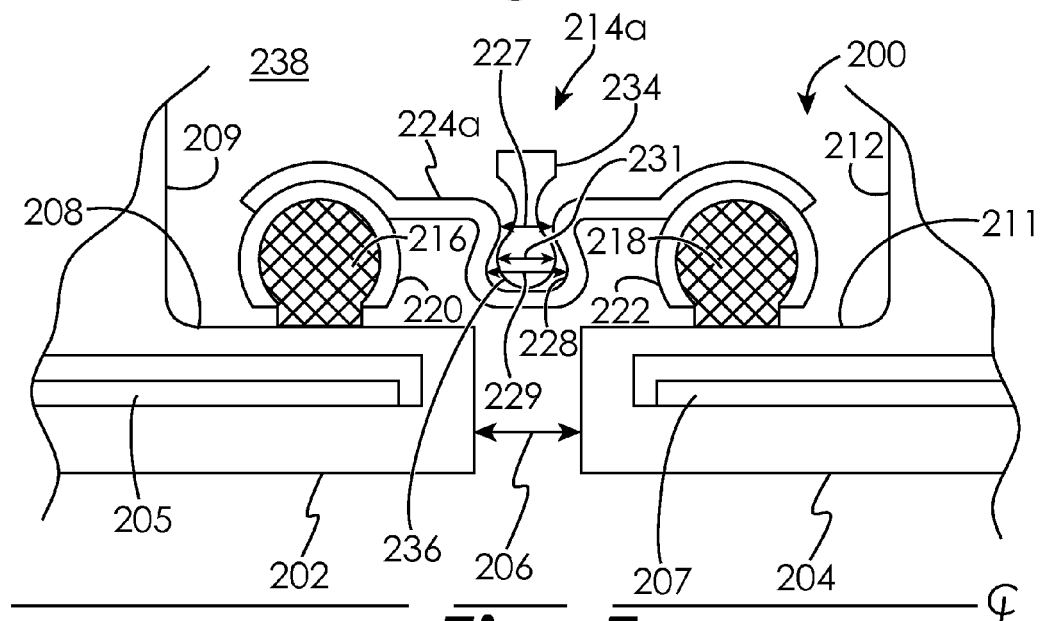
FIG. 5 is a schematic cross-sectional view of a seal and seal cavity in an embodiment.

FIG. 5 schematically illustrates a cross-sectional view of another embodiment of a seal 214a disposed in seal cavity 200 formed by two axially-adjacent segmented circumferential turbine components 202 and 204 which may move axially, radially, and circumferentially relative to one another about an axial centerline CL of the turbine engine. The seal 214a is formed from a material appropriate to the anticipated operating conditions of the seal 214a, such as a high-temperature metal alloy, a high temperature ceramic material, a high temperature ceramic composite, or a combination of two or more of these, to name just a few non-limiting examples. The seal 214a is similar to the seal 214. However, seal 214a is formed from a plurality of seal segments 226 (see FIG. 7) disposed adjacent one another to form the split hoop circumferential segmented seal 214a. Each seal segment 226 carrier 224a defines a cavity 228 therein. In an embodiment, a first axial dimension 227 of the cavity 228 at its opening is smaller than a second axial dimension 229 radially inward from the opening.

The plurality of seal segments 226 that comprise the split hoop circumferential segmented seal 214a are maintained in position by a retaining ring 234 extending through the cavity 228 of each of the seal segments 226. The retaining ring 234 may be formed as a split ring in an embodiment. The retaining ring 234 serves to radially, axially, and circumferentially align the seal segments 226, as well as to load them radially inward. In an embodiment, a third axial dimension 231 of the retaining ring 234 within the cavity 228 is greater than the first axial dimension at the cavity 228 opening, thereby allowing the retaining ring 234 to retain the seal segments 226 during assembly and disassembly of the seal 214a. In one embodiment, the retaining ring 234 includes a rounded radially inner end 236 within the cavity 224. In some embodiments, a portion of the retaining ring 234 forms an interference fit with a portion of the cavity 224.

Figure 6:
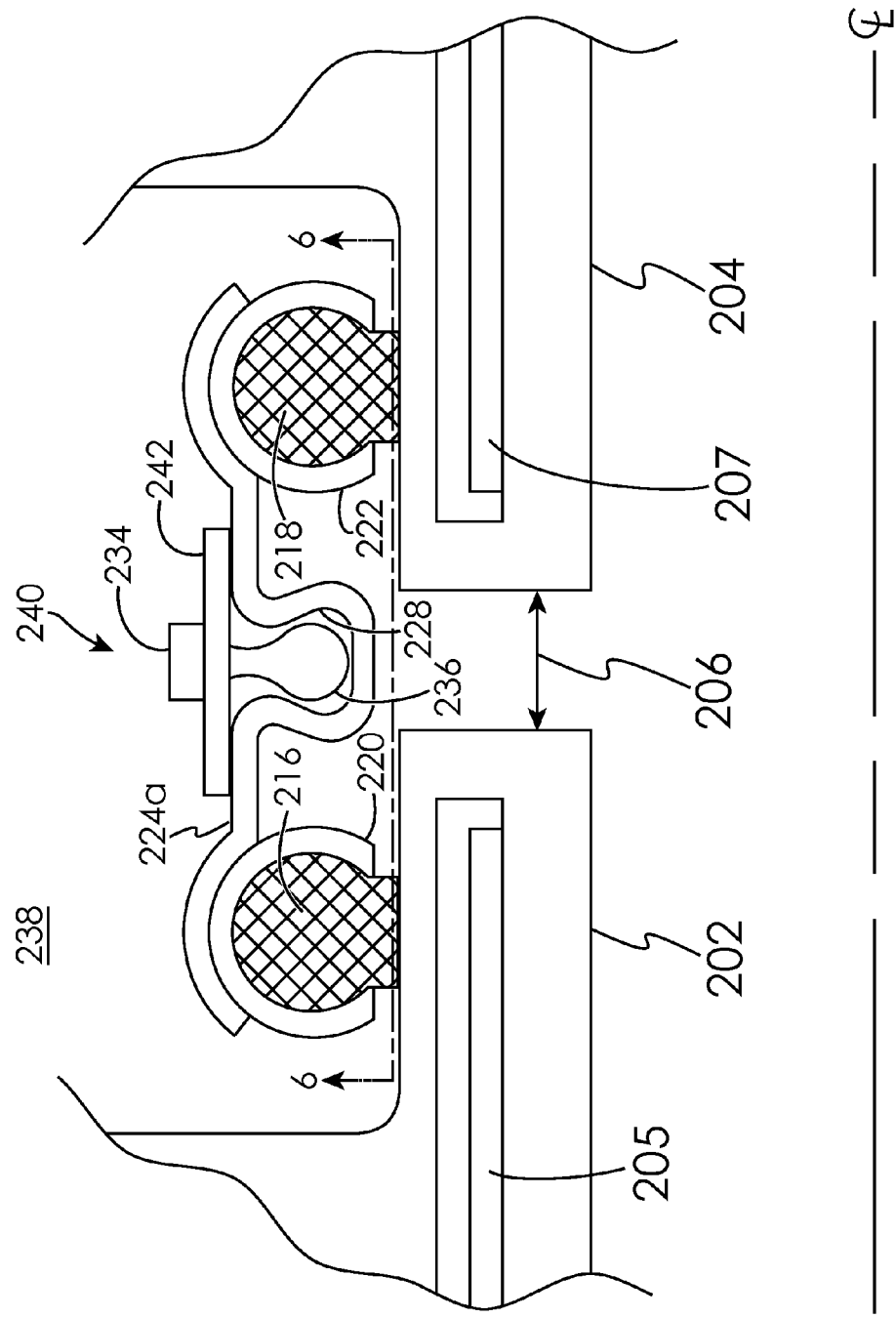
FIG. 6 is a schematic cross-sectional view of a seal in an embodiment.
Figure 7:
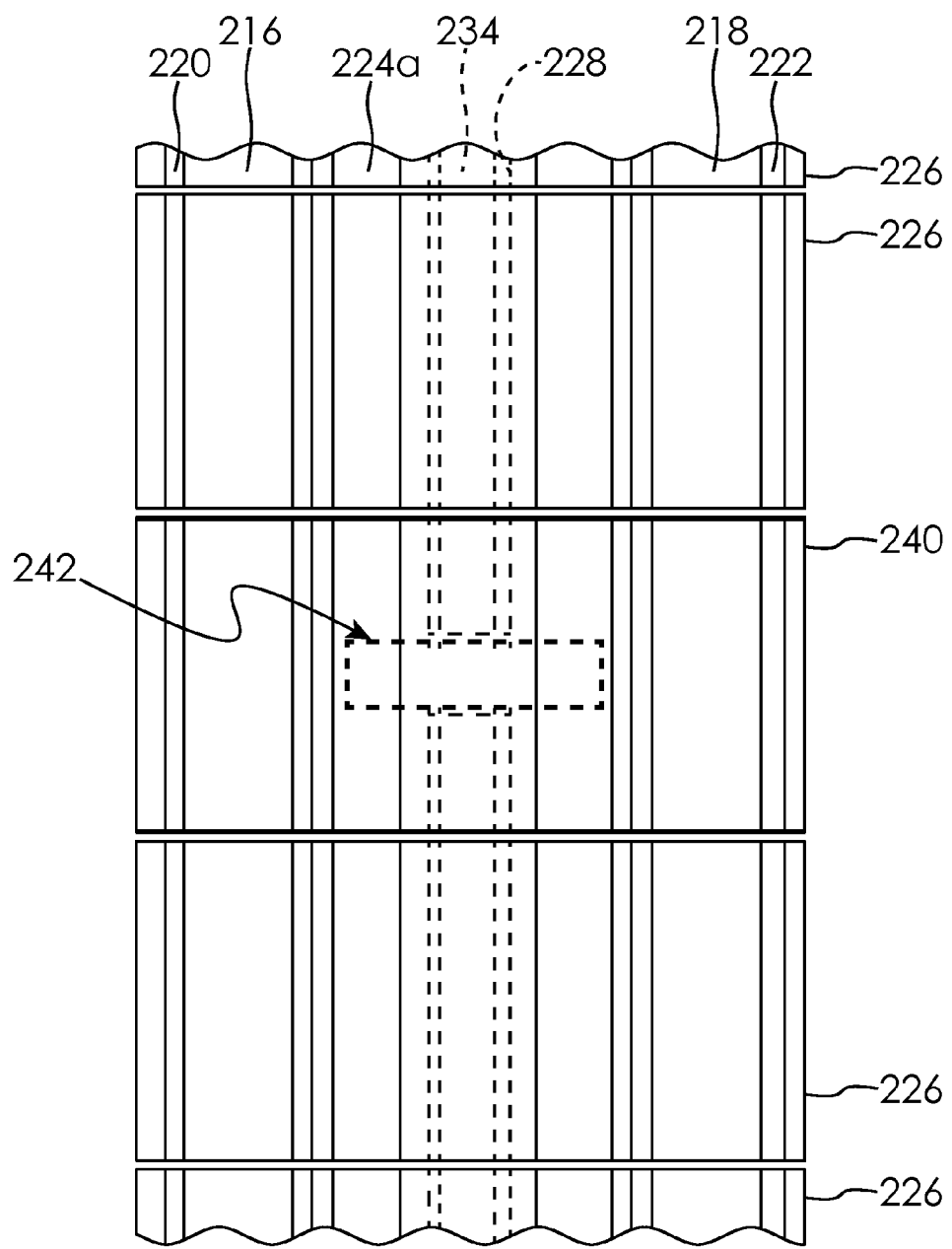
FIG. 7 is a schematic partial plan view of a seal in an embodiment.

FIGS. 6 and 7 schematically illustrate an embodiment of a retaining ring 234 keeper seal segment 240 located at a single circumferential location of the seal 214a in some embodiments. The retaining ring 234 keeper seal segment 240 includes an axial strap 242 across the opening 227 of the cavity 228. A first end of the retaining ring 234 (at the single split location) is received inside the cavity 228 within the keeper seal segment 240 on one side of the strap 242, while a second end of the retaining ring 234 is received inside cavity 228 on another side of the strap 242. In an embodiment, all other aspects of the keeper seal segment 240 are the same as the seal segments 226, thus providing sealing to the surfaces 208 and 211 in the area of the split in the retaining ring 234. The free-state diameter of the retaining ring 234 may be sized in various embodiments to either achieve a small gap at the strap 242 or to maintain a small circumferential preload against the strap 242. In some embodiments, the cumulative circumferential gap between all of the seal segments 226 and the keeper seal segment 240 may be sized as small as possible to minimize leakage at steady state conditions. In an embodiment, the cumulative circumferential gap is sized to permit limited circumferential lock-up of the seal segments 226 during a worst-case transient condition. Lock-up of the seal segments 226 would simply cause them to temporarily lift off the surfaces 208 and 211 and leak slightly more during the transient condition. The total cumulative circumferential gap will be randomly distributed among the various intersegment interfaces around the circumference. The keeper seal segment 240 further serves to anti-rotate the seal segments 226 relative to the retaining ring 234. In some embodiments, the keeper seal segment 240 is not present.

Both the split hoop seal 214 and the segmented seal 214a may be fabricated from sheet metal, to name just one non-limiting example. In an embodiment, the seal segments 226 may be sliced from a full hoop formed to the final cross-sectional shape of the seal segments 226, such as by using wire electrical discharge machining (WEDM), to name just one non-limiting example. Assembly of the seal 214a may be performed on a bench by sliding each seal segment 226 onto the retaining ring 234, starting at either or both of the ends thereof, followed by inserting both ends of the retaining ring 234 into the keeper seal segment 240. The seal assembly 214a may then be assembled, as a single unit, into either of the components 202, 204. The seal assembly may be temporarily held in place on the component 202, 204 during assembly of the remaining engine (or other device in which the seal 214a is being used) components by means of a substance that will vaporize at the operating temperature of the engine, such as wax and/or glue to name just two non-limiting examples.

Pressure in a secondary flow cavity 238 is transmitted to the seal cavity 200 through an opening defined by the components 202, 204. This pressure acts upon the surfaces of the seal 214, 214a, thereby causing the rope seal 216 to seat against the surface 208 of the component 202 and the rope seal 218 to seat against the surface 211 of the component 204. The load applied by the retaining ring 234 to the seal segments 226 in the seal 214a additionally helps the rope seals 216, 218 to seat against the respective surfaces 208 and 211, such as during engine start-up, for example. This prevents most or all of the secondary flow cavity 238 gases from reaching the design clearance 206 area.

Unlike the seal 108, the seal 214 is not substantially deflected as the components 202 and 204 move relative to each other during engine assembly and engine operation. Additionally, since each seal segment 226 of the seal 214a is able to rotate or rock on the retaining ring 234 independently of its neighboring seal segment 226, both sealing surfaces of the rope seals 216, 218 are able to better conform to radial stair-stepping and chording associated with component tolerances and thermal/mechanical loading of the components 202 and 204. Therefore, sealing is maintained while the components 202 and 204 and the components of the seal 214, 214a move relative to one another. Because the seal 214 slides (and the seal segments 216 rotate and slide) with respect to the components 202, 204, the seal 214, 214a is not substantially deflected by the relative movement between the components 202 and 204 and the seal 214, 214a may be formed from significantly thicker material than that used in the w-seal 108.

Additionally, the seal 214, 214a can be made from a lower strength material, such as cobalt alloys to name just one non-limiting example, that may be lower cost, have higher temperature capability, be more manufacturable, and/or more wear-resistant because thicker material may be used and/or lower strength lubricious material may be used. Additionally, the seal 214, 214a is less susceptible to distortion or breakage, which can cause leakage of gas past the seal 214, 214a and/or liberation of the seal. Furthermore, the seal 214, 214a exhibits improved vibration tolerance due to friction damping.

While the invention has been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed:

1. A seal for sealing a space defined by first and second adjacent components disposed about a centerline of a gas turbine engine, the seal comprising:
   a first compliant seal;
   a second compliant seal;
   a first retainer partially enclosing a first portion of the first compliant seal, the first portion of the first compliant seal being circular in cross-section;
   a second retainer partially enclosing a first portion of the second compliant seal, the first portion of the second compliant seal being circular in cross-section;
   a carrier having a first end secured to the first retainer and a second end secured to the second retainer;
   wherein the first and second compliant seals are configured to sealingly engage with the first and second components, wherein the first compliant seal comprises a first rope seal and second compliant seal comprises a second rope seal, and wherein a second portion of the first compliant seal that extends from the first portion of the first compliant seal is uncovered by the first retainer and has a substantially rectangular non-circular cross-section, and wherein a second portion of the second compliant seal that extends from the first portion of the second compliant seal is uncovered by the second retainer and has a substantially rectangular non-circular cross-section; and wherein the first retainer, the second retainer and the carrier are all separate pieces.

2. The seal of claim 1, further comprising a wave spring disposed between the carrier and at least one of the first and second components and operative to bias the first rope seal against the first component and the second rope seal against the second component.

3. The seal of claim 1, wherein the first and second rope seals comprise braided ceramic rope seals.

4. The seal of claim 1, wherein the first and second retainers are semi-circumferential in cross-section.

5. The seal of claim 1, wherein the seal is a continuous loop or a split seal.

6. The seal of claim 1, wherein the first retainer, the second retainer, and the carrier are formed from a material selected from one of a high-temperature metal alloy, a high-temperature ceramic material, and a high-temperature ceramic composite, or a combination of two or more of a high-temperature metal alloy, a high-temperature ceramic fiber material and a high-temperature ceramic fiber composite.

7. A system of a gas turbine engine, comprising:
a first arcuate component disposed about a centerline of the gas turbine engine and including a first surface;
a second arcuate component disposed about the centerline and including a second surface, the second arcuate component disposed adjacent the first arcuate component and defining a seal cavity therebetween; and
a seal for sealing the seal cavity, the seal including:
a first compliant seal;
a second compliant seal;
a first retainer partially enclosing a first portion of the first compliant seal, the first portion of the first compliant seal being circular in cross-section;
a second retainer partially enclosing a first portion of the second compliant seal, the first portion of the second compliant seal being circular in cross-section; and
a carrier having a first end secured to the first retainer and a second end secured to the second retainer, wherein the first compliant seal comprises a first rope seal and second compliant seal comprises a second rope seal, and wherein a second portion of the first compliant seal that extends from the first portion of the first compliant seal is uncovered by the first retainer and has a substantially rectangular non-circular cross-section, and wherein a second portion of the second compliant seal that extends from the first portion of the second compliant seal is uncovered by the second retainer and has a substantially rectangular non-circular cross-section; and
wherein the first retainer, the second retainer and the carrier are all separate pieces.

* * * * *